United States Patent [19]

Fender et al.

[11] Patent Number: 4,856,884
[45] Date of Patent: Aug. 15, 1989

[54] DYNAMICALLY MATCHED OPTICAL FILTERING IN A MULTIPLE TELESCOPE IMAGING SYSTEM

[75] Inventors: Janet S. Fender; Petras V. Avizonis, both of Albuquerque, N. Mex.

[73] Assignee: The United States of America as represented by the Secretary of the Air Force, Washington, D.C.

[21] Appl. No.: 169,241

[22] Filed: Mar. 16, 1988

[51] Int. Cl.⁴ .................. G02B 23/00; G02B 27/14; H01J 40/14; G01R 9/02
[52] U.S. Cl. ........................... 350/557; 350/171; 350/320; 350/486; 356/345; 250/550; 250/578
[58] Field of Search ............ 350/448, 3.67, 3.68, 350/3.84, 537, 557, 169, 171, 623, 624, 626, 637, 317, 320, 486; 250/201 R, 203 R, 550, 578; 356/354, 345, 446

[56] References Cited

U.S. PATENT DOCUMENTS

| | | | |
|---|---|---|---|
| 4,136,954 | 1/1979 | Jamieson | 356/349 |
| 4,292,634 | 9/1981 | Wu et al. | 343/5 CM |
| 4,465,366 | 8/1984 | Schmidt | 356/354 |
| 4,559,446 | 12/1985 | Suzuki | 250/204 |
| 4,584,484 | 4/1986 | Hutchin | 250/550 |
| 4,620,790 | 11/1986 | Hufnagel | 356/124 |
| 4,639,586 | 1/1987 | Fender et al. | 250/201 |
| 4,689,758 | 8/1987 | Carreras | 364/561 |

OTHER PUBLICATIONS

Multiple Mirror Telescope as a Phased Array Telescope, Applied Optics, 15 Aug. 1985, vol. 24, No. 16, pp. 2565-2576, Hege et al.

*Primary Examiner*—John K. Corbin
*Assistant Examiner*—Ronald M. Kachmarik
*Attorney, Agent, or Firm*—Richard J. Donahue; Donald J. Singer

[57] ABSTRACT

A dynamically matched optical filter is formed within a multiple telescope optical imaging system. Entrance and exit pupil geometries, the phases and tilts of multiple imaging paths and system alignments are sensed and controlled to allow wide field of view imaging and the enhancement or suppression of certain spatial frequencies of interest.

2 Claims, 3 Drawing Sheets

DYNAMICALLY MATCHED OPTICAL FILTERING IN A MULTIPLE TELESCOPE IMAGING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical imaging apparatus, and more particularly to a technique and apparatus for implementing a dynamically matched optical filter in a multiple telescope imaging system.

The broad concept of combining multiple telescopes so that they perform as a single larger aperture device is presently known. For example, in U.S. Pat. No. 4,639,586 entitled "Optically Phased Laser Transmitter", issued to Janet S. Fender et al on Jan. 27, 1987 and incorporated herein by reference, there is disclosed an apparatus and technique for phasing the outputs of a multiplier telescope array used as a laser transmitter.

One of the limitations of presently known multiple telescope systems is that they have a narrow field of view rendering them unsuitable for use in imaging systems, where a wide field of view is needed. The present invention is directed towards satisfying this need and providing additional desirable features in a multiple telescope imaging system.

SUMMARY OF THE INVENTION

In accordance with the present invention a dynamically matched optical filter is formed within an imaging system to enhance certain spatial frequencies of interest and suppress others. The spatial filter is established by the geometric configuration of a multiple aperture imaging system. The contrast of each imaged spatial frequency component is determined by the relative sizes and positions of apertures within the imaging system pupil, and the filter is tuned by adjusting the relative positions of the component apertures.

The optical filter can also be phase-modulated to change the visibility of certain spatial frequency components during a given observation time. This allows frame-to-frame differencing for rapid object recognition.

The optical system geometry provides wide field of view imaging since pupil geometries are maintained. A local sensing and control system preserves the desired geometry to optical precisions. Optical filtering in the spatial frequency domain is accomplished by deterministic perturbations of the exit pupil geometry. The observed visibility of imaged spatial frequency components is controlled by adjusting relative phases among the multiple imaging paths at the exit pupil. Dynamic filter tuning is accomplished by small axial motions of optical elements located near the exit pupil in the demagnified portion of the beam train.

DESCRIPTION OF THE PREFERRED EMBODIMENTS

Optical systems are generally linear and as such can be analyzed using Fourier theory. This means that optical systems can be characterized by impulse response functions and transfer functions. An impulse response function determines the far field irradiance produced by the imaging system illuminated by a perfect point source. A transfer function describes the filtering properties of an imaging system.

Optical systems selectively resolve certain spatial frequencies and not others. The transmitted spatial spectrum is a direct function of the properties of the imaging configuration in terms of physical geometry and phase relationships.

Mathematically, the imaging process can be described as follows:

$$A_i(x_i) = \int_{-a}^{a} A_o(x_o) \cdot h(x_i - x_o) dx_o \tag{1}$$

where $x_o$ and $x_i$ are object and image coordinates respectively, $A_o$ and $A_i$ are amplitudes at locations $x_o$ and $x_i$, and $h(x)$ is the optical system impulse response function. In fact, $h(x)$ is just the scaled Fourier transform of the optical system pupil function. Therefore $$h(x) = \tilde{P}(\lambda f x/d) \tag{2}$$

where $\lambda$ is the wavelength of energy being transmitted, $f$ is the imaging system focal length and $d$ is the aperture diameter. The tilda (~) represents the Fourier transformed function. The Fourier pairs that describe optical systems are spatial coordinates and spatial frequencies in units of cycles/length.

Coherent imaging systems are linear in complex amplitude. Therefore, $$I_i(x_i) = |A(x_i)|^2 \tag{3}$$

and the spatial frequency content of the image is $$\tilde{I}_i(x_i) = |\tilde{A}_o \tilde{h}|^2 \tag{4}$$

where $\tilde{A}_o$ is the amplitude spectral distribution of the object and $\tilde{h}$ is the coherent transfer function which is an amplitude filter function.

Incoherent imaging systems are linear in irradiance; therefore, $$I_i(x_i) = \int_{-a}^{a} I_o(x_o) \cdot h(x_i - x_o)^2 dx_o \tag{5}$$

and the spatial frequency content of the image is $$\tilde{I}_i(x_i) = \tilde{I}_o \cdot OTF \tag{6}$$

where $OTF = \tilde{f}h(x)$ is the Optical Transfer Function of an incoherent imaging system.

Both the coherent and incoherent transfer functions are determined by the system pupil characteristics. The coherent transfer function is simply the scaled pupil function.

$$H(\S,N) = P(-\lambda fx/d) \quad (7)$$

The incoherent transfer function, or the optical transfer function, is the auto-correlation of the scaled pupil function.

$$OTF = \int_{-a}^{a} P(\S - \lambda fx/d) P(\S + \lambda fx/d) d\S \quad (8)$$

Figure 1:
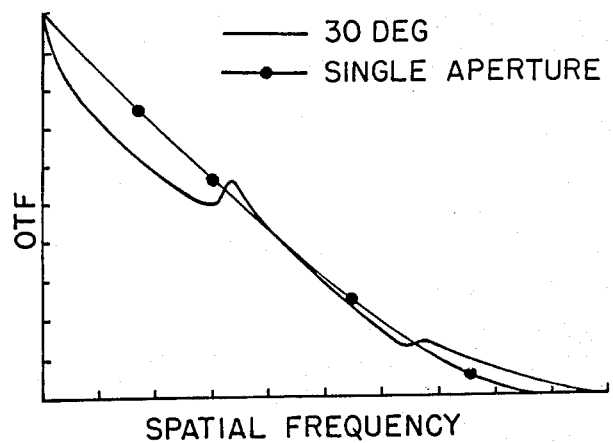
FIGS. 1–3 are graphs which depict the optical transfer function versus spatial frequency for imaging systems having different pupil geometries and phase characteristics.
Figure 2:
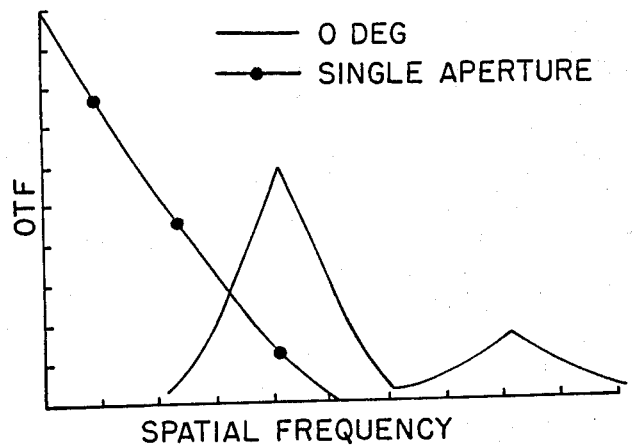
Figure 3:
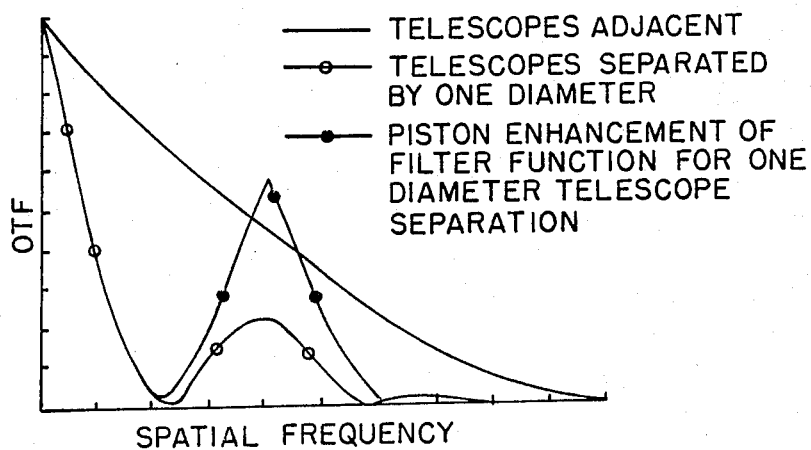

Examples of coherent and incoherent tranfer functions are shown in FIGS. 1-3 for different pupil geometries and phase characteristics.

Currently, optical filtering is accomplished by post-processing of recorded optical information. Optical filter functions are selected to enhance certain spatial frequencies and reject others. The optical filters are integrated into image reconstruction systems. This approach works well in situations where processing time is not an important consideration. Nonetheless, there are situations that demand real-time optical processing rather than post-processing.

The present invention is concerned with such real-time optical filtering. The filtering is accomplished by arranging the pupil geometry to produce a very specific optical transfer function. That transfer function can be altered or tuned by changing the pupil geometry. The crux of the present invention is the utilization of multiple path imaging systems for real-time optical filtering and a technique for dynamically tuning the optical filters.

The term, phased array optical systems, specifically means the coherent combination of a number of separate telescopes. Each telescope of the array has stand-alone imaging capability; however, the coherent combination of the separate images results in a total resolving power of a single imaging optic with a diameter equivalent to that of the array. To ensure that the array performance matches that of an equivalent single optic, two configuration rules must be followed. First, the exit pupil must be an exact demagnificaton of the entrance pupil. Simultaneously, the separate beams should be brought in an afocal sense to a single, final imaging optic. Both design features are critical elements of this invention and are discussed as this description proceeds.

Figure 4A:
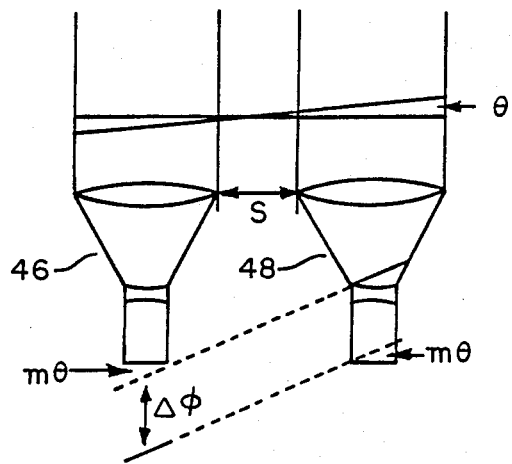
FIG. 4A is a geometric representation of a pair of telescopes whose pupil geometry is not maintained.
Figure 4B:
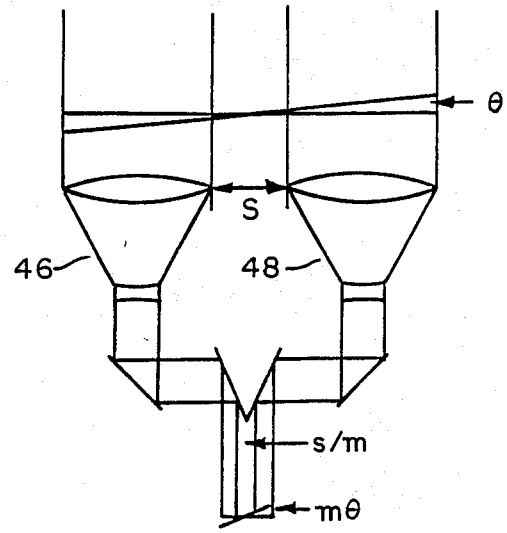
FIG. 4B is a geometric representation of a pair of telescopes whose pupil geometry is maintained.

FIGS. 4A and 4B illustrate the result of maintaining an exact linear magnification relationship between entrance and exit pupils of a pair of telescopes 46 and 48. In FIG. 4A, pupil geometry is not maintained; therefore, when axial images are in phase, field images will not be. Conversely, when pupil geometry is maintained, axial and field images will be in phase simultaneously as shown in FIG. 4B. Maintaining pupil geometry provides a wide field of view array imaging system. Such field of view is however, limited to the isoplanatic angles of the component telescopes. Off-axis aberrations of the telescopes cause relative dephasing of the images and therefore destroy the benefits of coherent image combination.

Two general approaches can be taken to maximize the coherent field of view. The first is to use large f/# component systems. Since the field of view, $\theta$, has a cubic dependance on the f/#, increasing f/# by a factor of two increases the isoplanatic angle by a factor of eight. The drawback to this approach is a total system with increased dimensions and poorer, structural dynamics and stability. The other approach is to correct for aberrations in each optical train by using adaptive optical components such as spatial light modulators, holographic aberration compensators, or aberration balancing lenses.

The coherent field of view is also determined by the method used for combining separate images. Images must be coplanar, of equal magnification and identical orientation, and of the same polarization across the coherent field of view. Many existing multiple telescope systems simply superimpose images. This produces a very narrow coherent field of view since separate images arrive at the focal plane with large relative angles with respect to each other. To optimize the coherent focal volume, beam combination must be accomplished in a manner whereby separate telescope wavefronts arrive in an afocal sense at a single focusing optic. In this case, the coherent focal volume is primarily limited by the aberrations of the focusing optic and relative aberrations of the separate telescopes, rather than the angles of incidence for different wavefronts. The beam combining element can be a multi-faceted reflective pyramid, a grating romb, or a waveguide assembly. Tolerances are critical for the beam combining element since it is in the demagnified portion of the optical system.

Three basic parameters must be sensed and controlled to maintain a high quality phased array imaging system. Telescope positions, tilt, and piston with respect to a parent sphere must be precisely measured and pupil plane geometrics controlled accordingly. For an imaging system, pupil geometry monitoring is most judiciously accomplished using a reference beam metrology.

In the specific phase and position sensing technique of the present invention, a single reference beam is divided into multiple beams which traverse separate telescope paths and are coherently combined, pair-wise, on focal planes. Relative telescope phase is measured as a fringe asymmetry under the intereference envelope, and aperture separations are directly proportional to fringe frequency.

To measure tilt, a holographic diffraction grating is deposited on the reference beam focusing mirror. The grating is designed to diffract a portion of the beam to an area on the focal plane where it will not interfere with light from the neighbor telescope. The diffraction energy produces an Airy disk whose position on the focal plane is determined by telescope tilt. Similarly, energy is diffracted from the adjacent telescope to produce the focal plane energy distribution. Individual telescope tilts move the spot centroids on the focal planes in direct proportion to the tilt angle of each telescope.

The hierarchy of control is as follows. Entrance pupil geometry is sensed and exit pupil geometry is adjusted to match it with a magnification factor determined by the magnification of the component telescopes. Pupil plane geometry is controlled by using small movable optics in the beam train of each component telescope. Axial motion corrects piston and position depending upon the position of the correcting element in the array optical train. Image position can be varied by axial mirror motions only if the correction element is located in front of the beam combiner. Tilt is controlled using a beam steering component. The physical nature of the controlling elements can range from mirrors with piezoelectric actuators to electro-optic devices such as Kerr cells.

All objects have a characteristic Fourier (spatial frequency) spectrum. This spectrum is established by the dimensions of the object and any velocity induced perturbations within a time interval less than or equal to the detector dwell time. If a Fourier transform is taken of such an object (an optical lens accomplishes that), then the dimensions of an object establish the width of the Fourier spectrum. The larger the object, the smaller is the width of the Fourier spectrum. The velocity component (if there is one) provides an apparent distortion of the object. When an optical lens takes the Fourier transform of an object that has a velocity component unresolved by the detector, the resulting Fourier spectrum is altered proportionally. The motion of an object during the framing time of detection system results in a finite width change of the Fourier spectrum. The spectral content of the image in the focal plane of a lens, as discussed earlier, is the product of the Fourier transform of the object and the Optical Transform Function of the imaging instrument.

In order to implement optical filtering for a given object, it is necessary to match the Optical Transfer Function (OTF) of the imaging system (the spatial frequency bandpass) to the spatial spectrum (Fourier transform) of the desired object. This will tune the imaging system to the object spectrum of interest and suppress Fourier components that lie outside of the bandpass of the geometrical optical filter. Since the Optical Transfer Function is the normalized auto-correlation of the pupil function, the pupil geometry of the imaging system must be adjusted in such a way as to give the appropriate transfer function to match the Fourier spectrum of the object. If this is accomplished, then not only is the desired object imaged, as described earlier, but simultaneously unwanted signals and noise are rejected.

Phased arrays lend themselves uniquely to such matched filtering in the sense that multiple apertures illuminating an imaging lens in essence provide an amplitude mask as a pupil function. Imaging phased arrays require dynamic piston, tilt phasing, and maintenance of the subaperture spacing so that pupil geometry relations are maintained, as discussed earlier herein. The same functions lend themselves in a natural way to tune the amplitude and phase mask on the imaging lens so that an appropriate pupil function is generated. Thus, varing the spacing will result in a change in the spatial frequency bandpass of the OTF. Varying the piston phase difference between two subapertures will result in the shift of the strength (intensity) of the fringes within a given frequency. There is therefore at hand the necessary parameters, unique to phased array optical systems (multiple beams, piston phase shift, and subaperture spacing) to generate an Optical Transfer Function that matches the object Fourier Spectrum. Multiple beams provide the basic pupil plane mask, whereas piston phase shifting and spacing of subapertures provide a way of manipulating the intensity and frequency of the Optical Transfer Function.

In FIG. 1, which shows an Optical Transfer Function for a seven subaperture closely packed array, the OTF is very close to that for an equivalent and single aperture. In FIG. 2, the spacing between the subapertures has been measured to equal the subaperture diameter. Thus it can be seen that for the same subaperture array, a major filter peak has been established at a certain spatial frequency. At the same time, in FIG. 3 it is seen that piston phase shifting can enhance or suppress the filter peak.

While the examples given herein are for circular subapertures. This invention, however, is by no means limited to such. Square, rectangular, or other subaperture forms may be used in the same way.

The piston phase shifters used herein are no different than in other implementations, such as referenced in U.S. Pat. No. 4,639,586, mentioned earlier. Such piston phase shifters basically are devices which change the length of an optical path and such changes can be accomplished by appropriate translation of mirrors or by electro-optical devices which change the refraction index or the thickness of the electro-optical material as a function of an applied electrical field. Such piston phase modulators are not new, and are used to control the phase shifts of the individual beams impinging on the imaging lens so as to construct an approximate pupil plane phase mask, which will then result in a matched filter.

Figure 5:
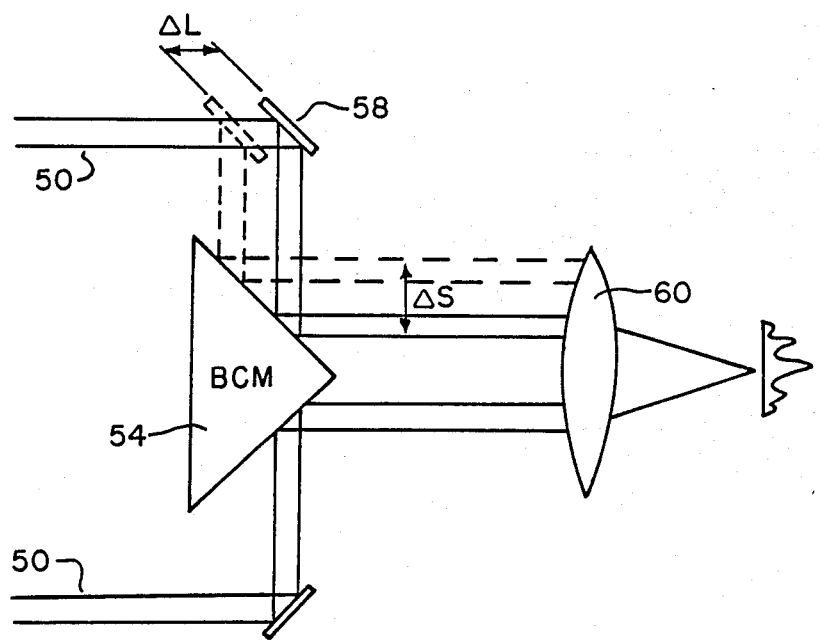
FIG. 5 is a geometric representation of the dynamic matched filter elements of the present invention.

In the present invention, the spacing between information collection subapertures is not controlled by physically displacing the telescopes, but by manipulating the spacing between the beams impinging upon the imaging lens. This can be accomplished in several ways, the most convenient technique being shown in FIG. 5 and involving the displacement of the beams 50 from the subapertures on the beam combining element 54. The change in beam or in essence the subaperture separation is achieved by a linear displacement of a beam displacing mirror 58. A linear displacement $\Delta L$ of mirror 58 will result in a change $\Delta S$ of the spacing between beams on the imaging lens 60 (from S to $S+\Delta S$). This linear displacement will also result in a small change in the optical path length of the manipulated subaperture beam 50 which would have to be corrected by providing a proportionately changing voltage to a phase modulator as the beam displacing mirror 58 is translated. In this situation an appropriate sensor like a Young's interferometer and sampling beams from adjacent telescopes can provide the necessary signals to the phase modulator so as to null out the phase differences in the optical paths. This would require the projection of probe beams in the outward direction (from the imaging lens) through the optical train to the telescopes.

As discussed before, in order to maintain good image quality, the pupil geometry (spacing and magnification must be maintained between the subtelescope apertures and the pupil plane in front of the imaging lens 60. The spacing between the beams illuminating imaging lens 60 is controlled by the beam displacing mirror 58 depicted in FIG. 5. Using a linear displacement of this mirror will result in a change of the separation between beams illuminating imaging lens 60. Thus the pupil geometry is controlled and changed. If the exit beam spacing is compared to the subaperture spacing, then any sensed differences between such measurements can be used to drive the beam displacing mirror 58 to null such differences.

Figure 6:
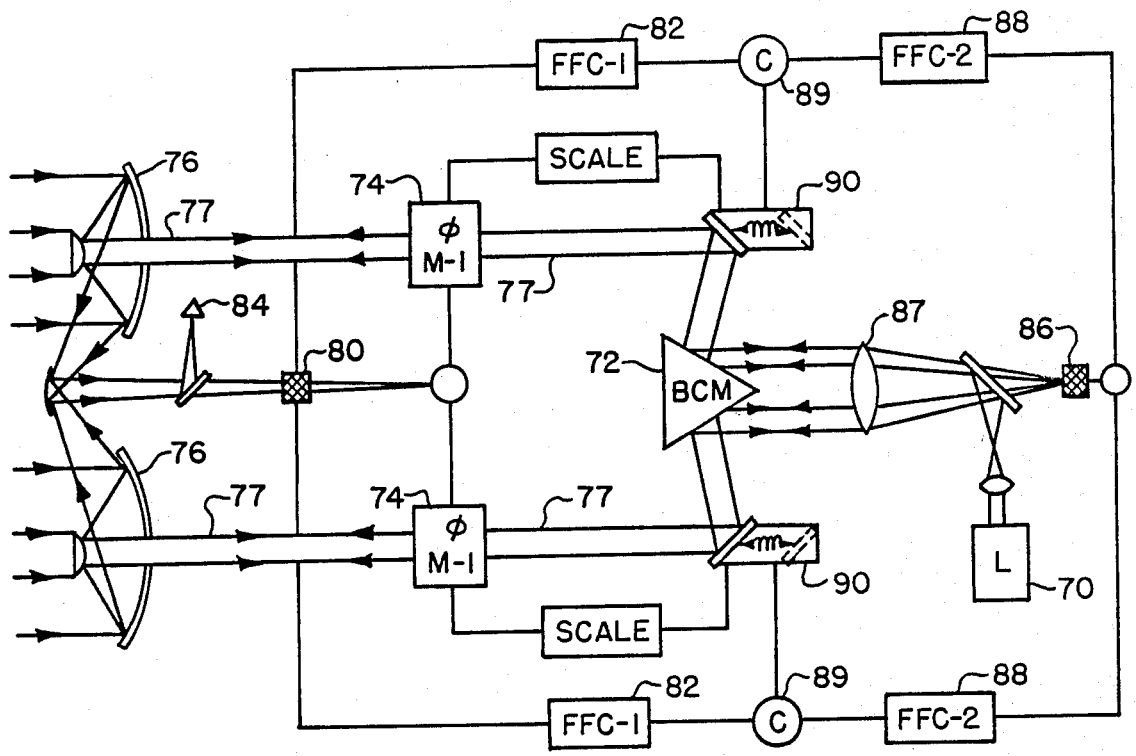
FIG. 6 is a representation of the control system which provides the dynamic maintenance of pupil geometry in the present invention.

The way this control system works is best understood with reference to FIG. 6. A low power laser 70 illuminates the beam combining mirror 72 which sends the multiple probe laser beams through phase modulators 74 into the subtelescopes 76 where the outputs of subtelescopes 76 are sampled pair-wise by appropriately applied holographic patches on their primaries. These sampled beams are focused onto a Young's Interferometer Detector 80 which provides the optical path difference between adjacent subtelescopes 76 and the spacing through the fringe frequency counter 82. At the same time, a part of the sampled beam is retro-reflected back through the optical train by the retro-reflector 84. Eventually this retro beam is imaged by a second Young's Inteferometer 86 which measures the fringe frequency. The spacing between subtelescopes 76 (entrance pupil) and the spacing between the multiple beams 77 where they impinge on the imaging lens 87 (exit pupil) is determined. The outputs of both fringe frequency counters 82 and 88 are sent to a comparator 89, and when a difference is sensed, it is used to drive a nulling amplifier which drives the beam displacing mirror 90 to zero fringe frequency difference. Since the beam displacing mirror 90 changes the optical path to detector 80, it is necessary to drive the phase modulator 74 to compensate for such optical path changes. First, it is driven coarsely by a position sensor on beam displacing mirror 90 with proper scaling. Then fine compensation is obtained by optical path difference measurement of the Young's Inteferometer detector 80 whose optical path difference measurement drives a phase modulator 74.

Dynamic Fourier filtering is achieved by driving a beam displacing mirror first in a ramp mode, to find a signal, then in a mulidither mode, so as to achieve the maximum signal to noise from the focal plane detector. This results in the best possible Fourier frequency match that a particular phased array configuration can achieve to the Fourier spectrum of an object being imaged.

The operation of this dynamic filtering mode requires that this ramp signal be applied as bias to the control loops that are used to maintain pupil geometry. In such a manner, pupil geometry is maintained, but such active maintenance operates in a biased mode rather than the previously described null mode. The control optimum is achieved through hill climbing servos which seek a signal maximum while varying or dithering a parameter which would cause a change in the signal. In this situation, the spatial filter is varied by dithering the beam displacing mirror, and the hill climbing servo drives the beam displacing mirror for maximum signal.

Figure 7:
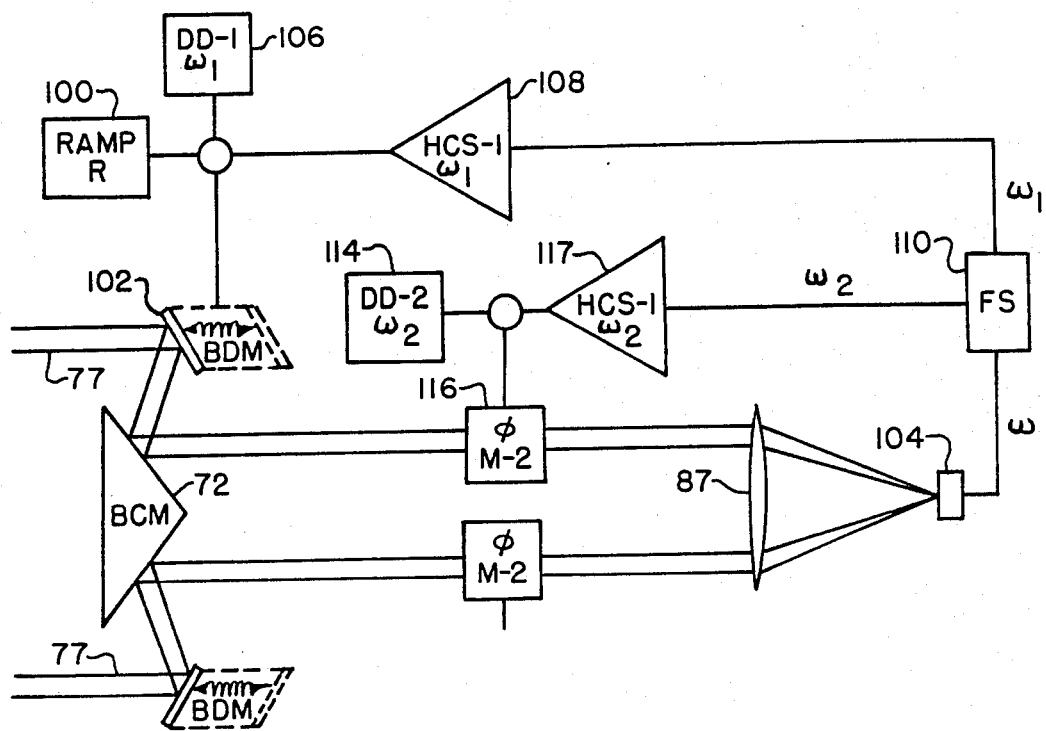
FIG. 7 is a representation of the dynamic Fourier filtering control system of the present invention.

The implementation of this dynamic filtering mode is shown in FIG. 7. Ramp drive 100 sweeps the beam displacing mirror 102 through all allowable Fourier frequencies until a signal is detected in the focal plane detector 104. Then beam displacing mirror 102 is dithered by dither drive 106 operating at ($\omega_1$). This causes the hill climbing servo 108 to find the maximum signal by driving beam displacing mirror 102 to a Fourier frequency which best matches that of the object. The focal plane detector 104 passes this signal at ($\omega_1$), along with other signals at other frequencies to a frequency splitter 110, which separates out the various detected frequencies and routes them to appropriate hill climbing servos.

Such "detuning" pupil function to cause an optical filter is implemented as a bias function to the dynamic pupil maintenance controls described earlier. A second dither drive 114, operating at ($\omega_2$) drives a phase modulator 116 and applies an appropriate phase shift to the impinging beam on to the imaging optics. This signal is also detected by the focal plane detector 104, but is separated out by frequency splitter 110 and routed to a hill climbing servo 117 operating at ($\omega_2$) frequency. This then closes the second matched Fourier filter optimization loop. This second loop adjusts the amplitude of the spatial filter to a signal optimum value whose optimum frequency was set by the first loop.

In such a manner, not only has a dynamic matched filter been established, but such a filter is totally adaptive in that it can change and follow a new object Fourier spectra as the object changes its aspect or velocity or both. If there is more than one object, then a track computer file would have to be established by switching filter frequencies periodically from one object to the other in a multiplexed fashion.

Although the controls described here deal only with two subapertures, any multiplicity of subapertures can be controlled in the same fashion. This can be done either through a hierarchy of controls for adjacent subapertures, or by an integrated design of a multiple input/multiple output system.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A multiple telescope optical imaging system having a dynamically matched optical filtering capability comprising:
   a plurality of optical telescopes each forming a subaperture beam of a composite image beam;
   beam combining means having a plurality of reflective surfaces;
   translatable beam displacement means in the beam path between each of said optical telescopes and an associated one of said reflective surfaces of said beam combining means, and reflecting a subaperture beam to a prescribed area on said associated one of said reflective surfaces;
   imaging means for receiving subaperture beams reflected from said beam combining means;
   said subaperture beams impinging on said imaging means being separated at said imaging means in accordance with particular displacements of said beam displacement means, whereby said subaperture beams are combined by said imaging means in a manner to enhance or suppress spatial frequencies of interest;
   means for driving said beam displacement means in a direction along the path of an associated subaperture beam and to a position for deriving the maximum output signal from said imaging means; and
   means for dithering said beam displacement means at a prescribed rate to vary the spatial frequency response of said imaging system.

2. A method for dynamically filtering the image formed by a synthetic aperture multiple telescope optical imaging system comprising the steps of:
   (a) providing beam displacement means in the paths of the subaperture beams of said system to be deflected onto separate reflective faces of a beam combining element;
   (b) reflecting the subaperture beams from said beam combining element onto an imaging lens;
   (c) providing a desired separation between subaperture beams where they impinge on said imaging lens by adjusting the positions of said beam displacement means; and
   (d) dithering the position of one or more of said beam displacement means to enhance or suppress spatial frequencies of interest.

* * * * *